United States Patent
Shimizu et al.

(10) Patent No.: US 11,299,203 B2
(45) Date of Patent: Apr. 12, 2022

(54) CRUISE ASSIST SYSTEM AND METHOD

(71) Applicant: DENSO CORPORATION, Kariya (JP)

(72) Inventors: Shun Shimizu, Kariya (JP); Yosuke Hirate, Kariya (JP); Daiji Watanabe, Kariya (JP); Toshiya Kabayama, Kariya (JP); Hisaya Akatsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 505 days.

(21) Appl. No.: 16/007,228

(22) Filed: Jun. 13, 2018

(65) Prior Publication Data

US 2018/0362080 A1 Dec. 20, 2018

(30) Foreign Application Priority Data

Jun. 14, 2017 (JP) .............................. JP2017-116699

(51) Int. Cl.
| | |
|---|---|
| *B62D 15/02* | (2006.01) |
| *B62D 6/00* | (2006.01) |
| *B60Q 9/00* | (2006.01) |
| *B60W 50/14* | (2020.01) |

(52) U.S. Cl.
CPC ............. *B62D 15/025* (2013.01); *B60Q 9/00* (2013.01); *B60W 50/14* (2013.01); *B62D 6/00* (2013.01); *B60W 2510/202* (2013.01); *B60W 2540/00* (2013.01); *B60W 2552/15* (2020.02); *B60W 2552/30* (2020.02); *B60W 2552/35* (2020.02); *B60W 2552/40* (2020.02); *B60W 2554/00* (2020.02); *B60W 2710/20* (2013.01)

(58) Field of Classification Search
CPC .................................................. B26D 15/025

USPC .......................................................... 701/41
See application file for complete search history.

(56) References Cited

U.S. PATENT DOCUMENTS

| | | | | |
|---|---|---|---|---|
| 8,155,837 B2* | 4/2012 | Aoki | ..................... | B60Q 1/0082 701/41 |
| 8,838,323 B2* | 9/2014 | Matsunaga | ........... | B60W 30/10 701/28 |
| 9,604,649 B1* | 3/2017 | Pastor | ................... | B60W 40/09 |

(Continued)

FOREIGN PATENT DOCUMENTS

JP 2010-202048 A 9/2010

OTHER PUBLICATIONS

Machine Translation of JP,2010-202048,A.*

*Primary Examiner* — Jean Paul Cass
(74) *Attorney, Agent, or Firm* — Maschoff Brennan

(57) ABSTRACT

In a cruise assist system, a turning angle controller executes at least one of an automatic cruise control task that automatically controls a turning angle of the vehicle, and an assist control task that controls the turning angle of the vehicle in accordance with an occupant's operation of the steering wheel. A holding determiner includes an input detector detecting an occupant's physical input to a steering shaft via a steering wheel based on at least one of a first type physical quantity and second type physical quantities. Each of the first and second physical quantities depends on rotational movement of the steering shaft. The first type physical quantity contains the occupant's physical input, and a disturbance input, which is different therefrom, to the steering shaft. The second type physical quantities have a physical relationship therebetween, which is changed depending on the occupant's physical input.

28 Claims, 8 Drawing Sheets

(56) References Cited

U.S. PATENT DOCUMENTS

| | | | | |
|---|---|---|---|---|
| 10,627,499 B2* | 4/2020 | Wang | ................... | G01S 13/582 |
| 2007/0029129 A1* | 2/2007 | Shiozawa | ................ | B62D 6/04 |
| | | | | 180/446 |
| 2009/0192679 A1* | 7/2009 | Kobayashi | ........... | B62D 5/0466 |
| | | | | 701/42 |
| 2010/0102972 A1* | 4/2010 | Middlekauff | ...... | B62D 15/0215 |
| | | | | 340/576 |
| 2011/0152729 A1* | 6/2011 | Oohashi | ................ | G10K 15/02 |
| | | | | 601/2 |
| 2011/0187862 A1 | 8/2011 | Ishikawa | | |
| 2011/0190983 A1* | 8/2011 | Monig | ............. | B60R 25/02153 |
| | | | | 701/41 |
| 2014/0046543 A1* | 2/2014 | Watanabe | ................ | B62D 6/04 |
| | | | | 701/41 |
| 2014/0292692 A1* | 10/2014 | Okuyama | ............. | B62D 1/046 |
| | | | | 345/173 |
| 2016/0272202 A1 | 9/2016 | Inomata | | |
| 2017/0088066 A1* | 3/2017 | Wang | .................. | G06F 3/04842 |
| 2017/0232973 A1* | 8/2017 | Otake | ................. | B60W 50/082 |
| | | | | 701/43 |
| 2018/0152185 A1* | 5/2018 | Kawahata | ............. | B62D 1/046 |
| 2018/0339725 A1* | 11/2018 | Kodera | ................ | B62D 6/002 |
| 2018/0345964 A1* | 12/2018 | Fujii | ..................... | B60W 50/14 |
| 2018/0362080 A1* | 12/2018 | Shimizu | ............... | B60W 50/14 |
| 2019/0009676 A1* | 1/2019 | Yokota | ................. | G06F 3/0484 |
| 2019/0073546 A1* | 3/2019 | Aoi | .................... | G06K 9/00375 |
| 2019/0092338 A1* | 3/2019 | Tsukasaki | .......... | B60G 17/0165 |

\* cited by examiner

FIG.7
| ROAD SHAPE | FORGETTING FACTOR A |
|---|---|
| LINEAR SHAPE | A1 |
| CURVED SHAPE | A2 |
292
FIG.8
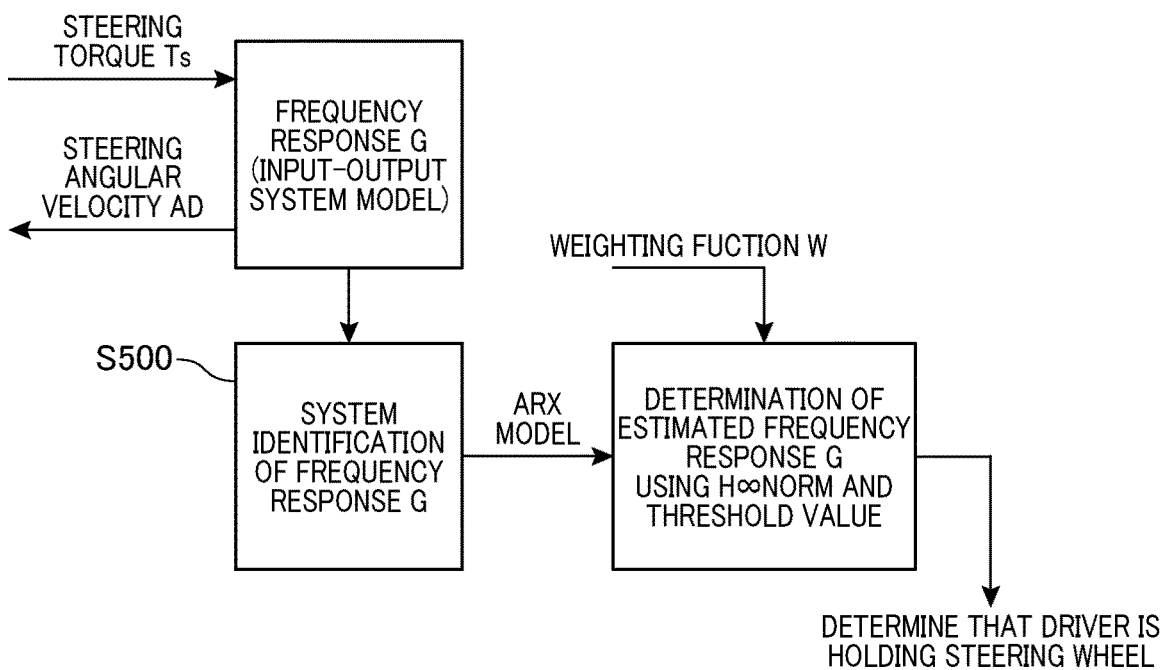
FIG.9
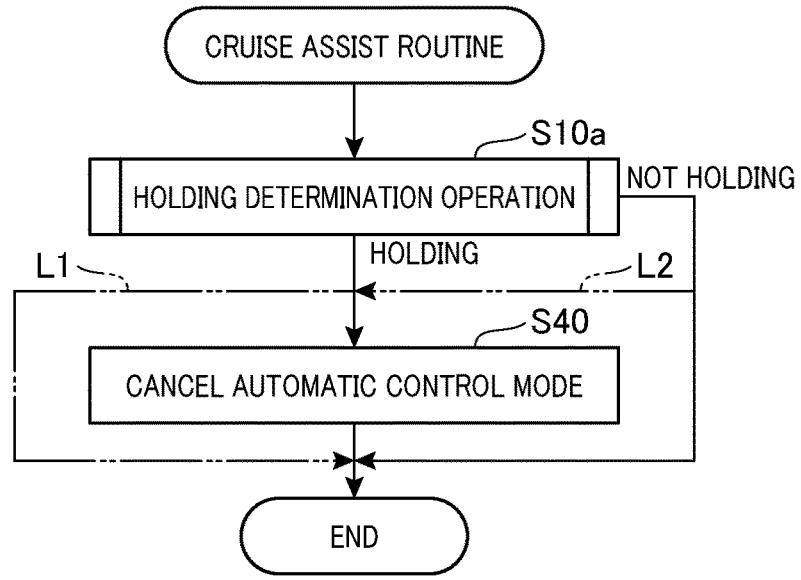

CRUISE ASSIST SYSTEM AND METHOD

CROSS REFERENCE TO RELATED APPLICATIONS

This application is based on and claims the benefit of priority from Japanese Patent Application 2017-116699 filed on Jun. 14, 2017, the disclosure of which is incorporated in its entirety herein by reference.

TECHNICAL FIELD

The present disclosure relates to cruise assist systems and methods capable of determining whether an occupant of a vehicle is holding a steering wheel of the vehicle.

BACKGROUND

There are known technologies that include a hold determiner and an execution determiner. The hold determiner determines whether an occupant of a vehicle is holding a steering wheel of the vehicle, and the execution determiner determines whether to execute an assist control task of the vehicle in accordance with whether an occupant of the vehicle is holding the steering wheel. Japanese Patent Application Publication 2015-101240 for example discloses such a technology; this technology will be referred to as a conventional published technology.

SUMMARY

The hold determiner of the conventional published technology is more specifically configured to (1) Count a time for which actual steering torque of the steering wheel, which is actually input to the steering wheel, has been continuously lower than a predetermined time threshold (2) Determine whether the counted time has exceeded a predetermined threshold time Then, the hold determiner is configured to determine that a driver occupant is not holding the steering wheel, that is, a driver occupant is operating the vehicle with the occupant's hands free from the steering wheel upon, determining that the counted time has exceeded the predetermined threshold time.

The actual steering torque may contain, in addition to occupant's input torque indicative of torque actually input from a driver to the steering wheel, disturbances applied as input torque to the steering wheel, such as torque caused due to irregularities of a road on which the vehicle is travelling. The determination of whether a driver occupant is holding the steering wheel or a driver occupant is operating with the occupant's hands free in accordance with the actual steering torque of the steering wheel may therefore result in an erroneous determination due to these disturbances acting as input torque applied to the steering wheel.

It has been therefore desired to provide technologies that enable the accuracy of determination of whether an occupant of a vehicle is holding the steering wheel to be more improved than the corresponding determination accuracy based on the conventional published technology.

The present disclosure aims to address at least part of the problem set forth above, and can be designed as, for example, first and second exemplary aspects described hereinafter.

According to the first exemplary aspect of the present disclosure, there is provided a cruise assist system for a vehicle including a steering mechanism that includes a steering wheel and a steering shaft coupled to the steering wheel. The cruise assist system includes a turning angle controller configured to execute at least one of an automatic cruise control task that automatically controls a turning angle of the vehicle, and an assist control task that controls the turning angle of the vehicle in accordance with an occupant's operation of the steering wheel. The cruise assist system includes a holding determiner configured to determine whether an occupant is holding the steering wheel in accordance with an occupant's physical input to the steering shaft via an operation of the steering wheel. The holding determiner includes an input detector configured to detect the occupant's physical input to the steering shaft based on at least one of a first type physical quantity and second type physical quantities. Each of the first and second physical quantities depend on rotational movement of the steering shaft. The first type physical quantity contains the occupant's physical input, and a disturbance input to the steering shaft. The disturbance input is different from the occupant's input. The second type physical quantities have a physical relationship therebetween. The physical relationship is changed depending on the occupant's physical input. The input detector is configured to, when using the first type physical quantity, perform a task of reducing, from the first type physical quantity, the disturbance input to obtain a remaining physical quantity as the occupant's physical input. The input detector is configured to, when using the second type physical quantities, detect the occupant's physical input based on the physical relationship between the second type physical quantities.

According to the second exemplary aspect of the present disclosure, there is provided a cruise assist method for a vehicle including a steering mechanism that includes a steering wheel and a steering shaft coupled to the steering wheel. The cruise assist method includes detecting an occupant's physical input to the steering shaft via an operation of the steering wheel based on at least one of a first type physical quantity and second type physical quantities. Each of the first and second physical quantities depends on rotational movement of the steering shaft. The first type physical quantity contains the occupant's physical input, and a disturbance input to the steering shaft, the disturbance input being different from the occupant's input. The second type physical quantities have a physical relationship therebetween that is changed depending on the occupant's physical input. When using the first type physical quantity, the detecting step performs a task of reducing, from the first type physical quantity, the disturbance input to obtain a remaining physical quantity as the occupant's physical input. When using the second type physical quantities, the detecting step detects the occupant's physical input based on the physical relationship between the second type physical quantities. The cruise assist method includes determining whether the occupant is holding the steering wheel in accordance with the occupant's physical input.

Each of the cruise assist system and method is configured to perform the task of reducing, from the first type physical quantity, the disturbance input to obtain the remaining physical quantity as the occupant's physical input upon using the first type physical quantity. This results in improvement of the accuracy of detecting the occupant's physical input, because disturbance input has been eliminated from the occupant's physical input.

Each of the cruise assist system and method is also configured to detect the occupant's physical input based on the physical relationship between the second type physical quantities upon using the second type physical quantity; the physical relationship is changed depending on the occupant's physical input. This configuration therefore results in a higher accuracy of determining whether the occupant's physical input is being applied to the steering wheel, resulting in improvement of the accuracy of determining whether the occupant is holding the steering wheel based on the result of determining whether the occupant's physical input is being applied to the steering wheel.

The present disclosure can be implemented by various embodiments in addition to the cruise assist system and method; the various embodiments include programs for configuring a computer to execute the steps of the cruise assist method, and storage media storing the programs, and image generating methods.

BRIEF DESCRIPTION OF THE DRAWINGS

Other aspects of the present disclosure will become apparent from the following description of embodiments with reference to the accompanying drawings in which:

FIG. 7 is a diagram schematically illustrating an environmental information table stored in a memory illustrated in FIG. 6;

FIG. 8 is a block diagram schematically illustrating how a holding determiner illustrated in FIG. 6 determines whether a driver occupant is holding a steering wheel;

FIG. 9 is a flowchart schematically illustrating a cruise assist routine carried out by the cruise assist system illustrated in FIG. 6;

DETAILED DESCRIPTION OF EMBODIMENT

Figure 1:
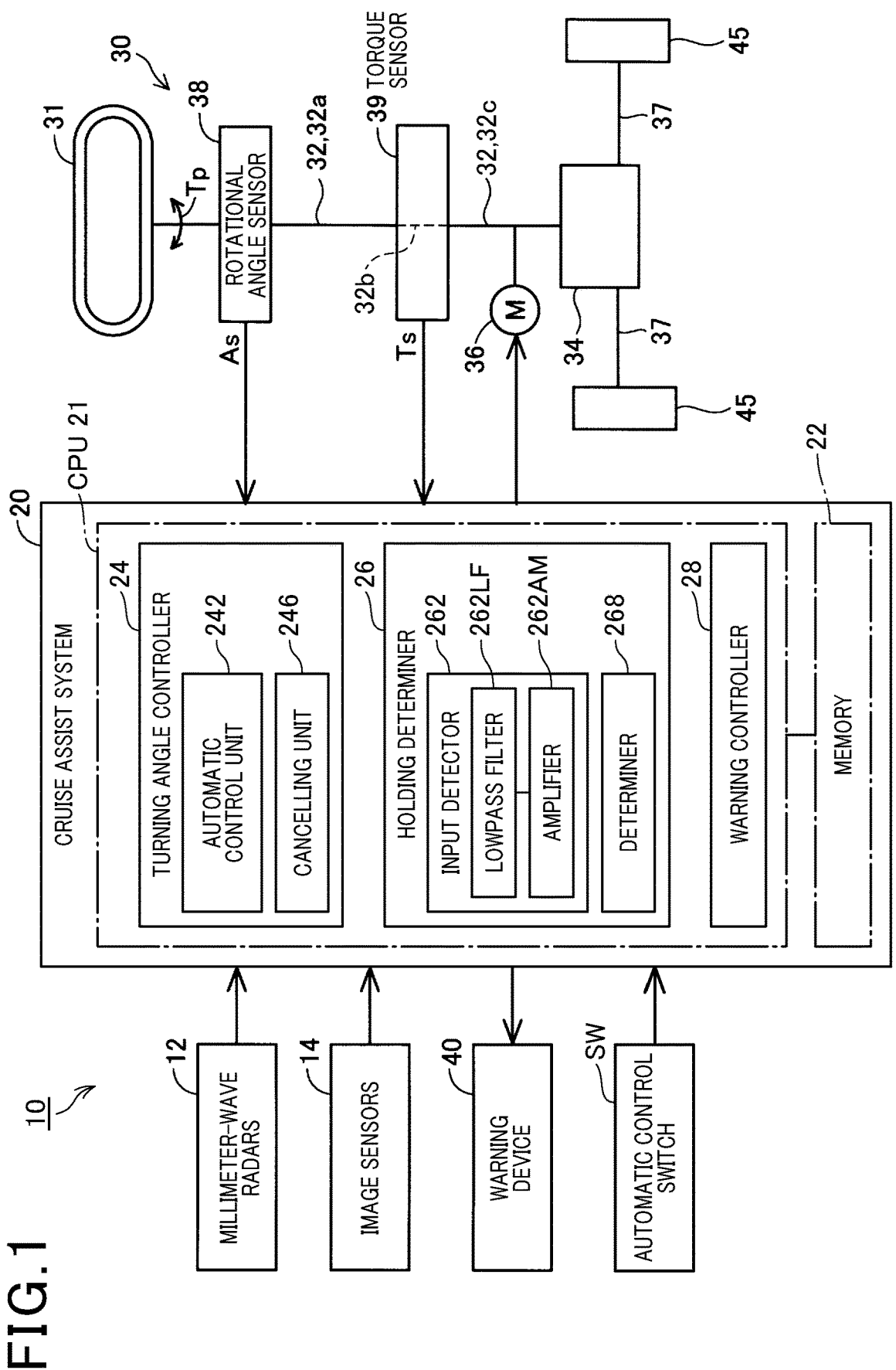
FIG. 1 is a block and circuit diagram schematically illustrating a system configuration of a vehicle in which a cruise assist system according to the first embodiment of the present disclosure is installed.
Figure 2:
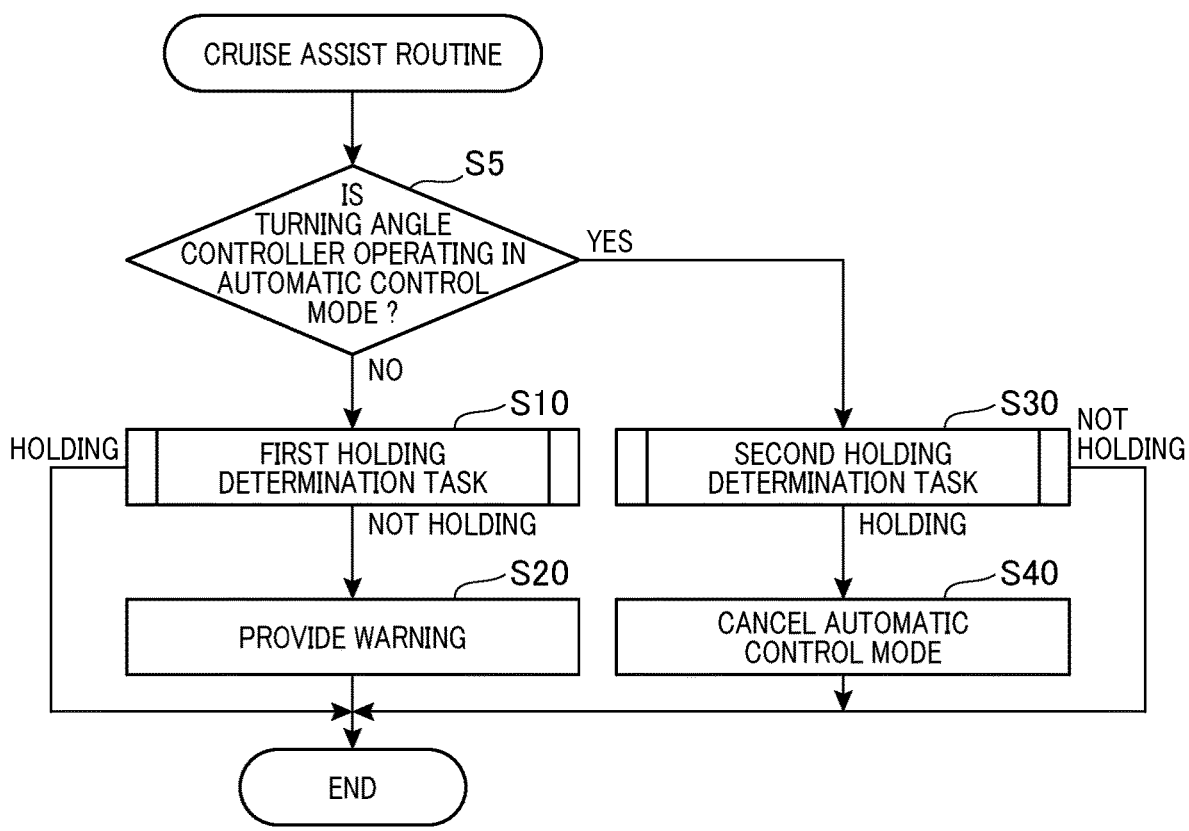
FIG. 2 is a flowchart schematically illustrating a cruise assist routine carried out by the cruise assist system illustrated in FIG. 1.

The following describes preferred embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 10.

Referring to FIG. 1, an own vehicle 10, referred to simply as a vehicle 10, includes millimeter-wave radars 12, image sensors 14, a cruise assist system 20 according to the first embodiment, a steering mechanism 30, and a warning device 40.

The millimeter-wave radars 12 aim to detect objects located within a predetermined first detection region surrounding the vehicle 10; the first detection region includes, for example, a front region, lateral side regions, and diagonally rearward regions of the own vehicle 10.

Specifically, each millimeter-wave radar 12 transmits frequency-modulated millimeter waves to a corresponding part of the first detection region, and receives reflected waves, such as echoes, generated based on reflection of the transmitted radar waves from target objects located in the part of the first detection region. Then, each the millimeter-wave radar 12 detects, based on the received reflected waves, the position of each target object, the horizontal and/or vertical azimuths of each target object relative to the vehicle 10, and the distance of each target object relative to the vehicle 10.

Each of the image sensors 14 includes a camera device that successively captures images of a corresponding part of a predetermined second detection region surrounding the vehicle 10; the second detection region includes, for example, a front region, lateral side regions, and diagonally rearward regions of the own vehicle 10. The second detection region can be identical to or can have a common region with the first detection region.

The steering mechanism 30 is comprised of, for example, a steering wheel 31, a steering-shaft assembly 32, a turning mechanism 34, a motor 36, turning axles 37, a rotational-angle sensor 38, and a torque sensor 39.

The steering wheel 31 serves as an occupant's operable input device that inputs, to the turning mechanism 34, information for changing the travelling direction of the vehicle 10 upon being operated by an occupant, such as a driver, of the vehicle 10.

The steering-shaft assembly 32 includes an upper steering shaft 32a having opposing first and second ends, a torsion bar 32b having opposing first and second ends, and a lower steering shaft 32c having opposing first and second ends. The steering wheel 31 is mounted to the first end of the upper steering shaft 32a, so that the upper steering shaft 32a is configured to be turned together with the steering wheel 31. The second end of the upper steering shaft 32a is coupled to the first end of the torsion bar 32b. The second end of the torsion bar 32b is coupled to the first end of the lower steering shaft 32c that serves as an output shaft. The second end of the lower steering shaft 32c is coupled to the turning mechanism 34. Input information, i.e. input torque, applied to the steering shaft assembly 32 based on the occupant's turning operation of the steering wheel 31 will be referred to as occupant's physical input, i.e. occupant's input torque, Tp.

The turning mechanism 34 is designed as a rack-and-pinion mechanism including a rod-shaped rack and a pinion. The pinion is mounted to the second end of the lower steering shaft 32c, and is engaged with the rack. The rack is located in the horizontal direction, i.e. the width direction, of the vehicle 10, and has two opposing ends. Each of the turning axles 37 has opposing first and second ends. The first end of each of the turning axles 37 is coupled to a corresponding one of both ends of the rack. One of front wheels 45 is mounted to the second end of one of the turning axles 37, and the other of the front wheels 45 is also mounted to the second end of the other of the turning axles 37.

An occupant's turning effort of the steering wheel 31 is transferred to the turning mechanism 34 via the steering-shaft assembly 32, so that the pinion of the turning mechanism 34 is rotated. Rotation of the pinion of the turning mechanism 34 enables the rack to move in the horizontal direction, i.e. the vehicle width direction. This horizontal movement of the rack of the turning mechanism 34 results in horizontal movement of the turning axles 37, so that the front wheels 45 are turned. That is, controlling occupant's turning effort of the steering wheel 31 enables the front wheels 45 to be controllably turned.

The torque sensor 39 includes the torsion bar 32b connecting between the upper and lower steering shafts 32a and 32c. Occupant's steering operation of the steering wheel 31 causes the upper steering shaft 32a to turn, so that the torsion bar 32b is also turned in synchronization with turning of the upper steering shaft 32a. Because of friction between the tires of the front wheels 45 and the road on which the vehicle 10 is travelling, the lower steering shaft 32c is turned while being delayed with respect to the turning of the upper steering shaft 32a, resulting in the torsion bar 32b being twisted relative to the lower steering shaft 32c.

The torque sensor 39 outputs a signal indicative of steering torque Ts as a first type physical quantity according to the first embodiment; the steering torque Ts shows how the torsion bar 32b is twisted relative to the lower steering shaft 32c. That is, the torque sensor 39 measures the steering torque Ts.

For example, the torque sensor 39 outputs a positive signal value of the steering torque Ts when the steering wheel 31 has turned rightward relative to the reference position of the steering wheel 31, and outputs a negative signal value of the steering torque Ts when the steering wheel 31 has turned leftward relative to the reference position of the steering wheel 31.

That is, the steering torque Ts serving as the first type physical quantity depends on rotational movement of the steering-shaft assembly 32; the rotational movement of the steering assembly 32 is caused by both the occupant's physical input Tp and disturbance input different from the occupant's physical input Tp. The disturbance input applied to the steering-shaft assembly 32 includes, for example, torque caused due to irregularities of the road on which the vehicle 10 is travelling.

That is, the first type physical quantity measured by the torque sensor 32 includes an occupant's input physical quantity due to the occupant's physical input Tp and a disturbance physical quantity due to the disturbance input.

The rotational angle sensor 38 is mounted to, for example, the upper steering shaft 32a, and is configured to measure a steering angle of the steering wheel 31, i.e. a steering position of the steering wheel 31, as a rotational angle As of the upper steering shaft 32a.

For example, the rotational angle sensor 38 measures the steering angle of the steering wheel 31 being zero degrees (0°), that is, the rotational angle As of the upper steering shaft 32a being zero degrees, while the vehicle 10 is travelling straight ahead. The steering angle of the steering wheel 31 being zero degrees will be referred to as a reference angle or reference position of the steering wheel 31 hereinafter.

In addition, the rotational angle sensor 38 outputs a positive value of the steering angle of the steering wheel 31, i.e. a positive value of the rotational angle As of the upper steering shaft 32a, when the steering wheel 31 has turned rightward relative to the reference position of the steering wheel 31. Moreover, the rotational angle sensor 38 outputs a negative value of the steering angle of the steering wheel 31, i.e. a negative value of the rotational angle As of the upper steering shaft 32a, when the steering wheel 31 has turned leftward relative to the reference position of the steering wheel 31.

As another example, the rotational angle sensor 38 outputs a positive absolute value of the steering angle of the steering wheel 31, i.e. a positive absolute value of the rotational angle As of the upper steering shaft 32a, within 360 degrees and the number of rotations of the steering wheel 31. For example, a magnetic rotational-angle sensor can be used as the rotational-angle sensor 38.

The motor 36 is coupled to the lower steering shaft 32c. The motor 36 is configured to rotate the lower steering shaft 32c in accordance with an automatic control instruction sent from a turning angle controller 24, which is described later, operating in an automatic control mode, thus enabling the front wheels 45 of the vehicle 10 to be steered to target turning angles. The motor 36 is also configured to rotate the lower steering shaft 32c in accordance with an assist control instruction sent from the turning angle controller 24 operating in an assist control mode, thus assisting the horizontal movement of the rack. This enables the turning of the steering shaft assembly 32 to be assisted.

The warning device 40 includes, for example, at least one of a visible output device, such as an LED lamp installed in the interior of the vehicle 10, and an audible output device, such as a buzzer installed in the interior of the vehicle 10. The warning device 40 is configured to provide, to a driver occupant of the vehicle 10, visible and/or audible warning information indicative of urging a driver occupant of the vehicle 10 to hold the steering wheel 31 in accordance with an instruction sent from the cruise assist system 20.

The cruise assist system 20 includes the turning angle controller 24, a holding determiner 26, and a warning controller 28.

For example, the cruise assist system 20 is comprised of at least one microcomputer circuit including a CPU 21 and a memory 22 that includes, for example, at least one of semiconductor memories, such as a RAM, a ROM, and a flash memory. These semiconductor memories are examples of non-transitory storage media.

For example, the CPU 21 can run one or more programs, i.e. program instructions, stored in the memory 22 to thereby cause the CPU 21 to serve as the turning angle controller 24, the holding determiner 26, and the warning controller 28. In other words, the CPU 21 can run programs stored in the memory 22, thus performing functions of the turning angle controller 24, functions of the holding determiner 26, and functions of the warning controller 28. At least one of the functions of the cruise assist system 20 can be implemented as a hardware electronic circuit. For example, the various functions of the cruise assist system 20 can be implemented by a combination of electronic circuits including digital circuits, which include many logic gates, analog circuits, digital/analog hybrid circuits, or hardware/software hybrid circuits.

Note that the cruise assist system 20 can be comprised of microcomputer circuits each including a CPU and a memory, and the microcomputer circuits can serve as the respective turning angle controller 24, holding determiner 26, and warning controller 28. In addition, a first microcomputer circuit selected from the microcomputer circuits can serve as one of the turning angle controller 24, holding determiner 26, and warning controller 28, and a second microcomputer circuit selected from the microcomputer circuits can serve as the remainder of the turning angle controller 24, holding determiner 26, and warning controller 28.

The turning angle controller 24 is configured to selectably operate in one of the automatic control mode and the assist control mode, and to control the motor 36 to thereby automatically adjust, i.e. control, the turning angles of the respective front wheels 45 upon selecting the automatic control mode. The turning angle controller 24 is also configured to control the motor 36 to thereby assist the horizontal movement of the rack.

For example, an automatic control switch SW, which is designed as an occupant-operable on-off switch, is provided in the interior of the vehicle 10, and is communicably connected to the CPU 21 of the cruise assist system 20. That is, occupant's turning on the automatic control switch SW causes the CPU 21, i.e. the turning angle controller 24, to operate in the automatic control mode.

That is, in the automatic control mode, the turning angle controller 24 periodically supplies a target current value that is determined based on a target turning-angle value for each front wheel 45, to the motor 36 to thereby drive the motor 36. Periodically driving the motor 36 based on a target current value enables the turning angle of each of the front wheels 45 to be periodically adjusted, i.e. controlled to the target turning-angle value. This enables the vehicle 10 to travel while keeping the inside of the corresponding lane.

Specifically, the turning angle controller 24 includes, for example, an automatic control unit 242 and a cancelling unit 246.

The automatic control unit 242 sends the automatic control instruction to the motor 36 for instructing the motor 36 to turn the lower steering shaft 32c to control the turning angles of the front wheels 45 each time the operation mode of the turning angle controller 24 is switched from the assist control mode to the automatic control mode, or continuously sends the automatic control instruction to the motor 36 for each period during which the turning angle controller 24 is operating in the automatic control mode.

For example, the automatic control unit 242 sequentially obtains an image of the front region ahead of the vehicle sequentially captured by the corresponding image sensor 14. Then, the automatic control unit 242 sequentially performs a known lane-marking line detection task based on the sequentially obtained images to thereby detect lane marking lines that partition the travelling lane of the vehicle 10 in the road. Then, the automatic control unit 242 controls the motor 36 to automatically adjust the turning angles of the front wheels 45 to thereby cause the vehicle 10 to travel on the road while keeping the inside of the traveling lane.

In the automatic control mode, turning the lower steering shaft 32c by the motor 36 causes the upper steering shaft 32a to turn, resulting in turning of the steering wheel 31.

As described later, the holding determiner 26 determines whether an occupant, such as a driver, of the vehicle 10 is holding the steering wheel 31 during the automatic control mode. The canceling unit 246 causes the automatic control unit 242 to cancel the automatic adjustment of the turning angles of the front wheels 45 in the automatic control mode upon being determined by the holding determiner 26 that a driver occupant of the vehicle 10 is holding the steering wheel 31. In addition, the cancelling unit 246 causes the automatic control unit 242 to cancel the automatic adjustment of the turning angles of the front wheels 45 in the automatic control mode upon the automatic control switch SW being turned off by an occupant.

As described above, the holding determiner 26 determines, based on the occupant's physical input Tp applied from an occupant to the steering-shaft assembly 32, i.e. the upper steering shaft 32a, whether an occupant, such as a driver occupant, of the vehicle 10 is holding the steering wheel 31 during the automatic control mode.

Specifically, the holding determiner 26 includes an input detector 262 and a determiner 268.

The input detector 262 is configured to reduce or remove, from the steering torque Ts, torque constituting the disturbance physical quantity to thereby obtain a corrected first type physical quantity, and detect the occupant's physical input Tp based on the corrected first type physical quantity.

For example, the signal based on values of the steering torque Ts measured by the torque sensor 39, which will also be referred to as a steering torque signal TsS, has frequency characteristics. The input detector 262 extracts, from the steering torque signal TsS, specified torque components respectively having specified frequency components that are contained within a predetermined frequency range to thereby reduce, from the steering torque signal TsS, the remaining torque components whose frequency components are outside the predetermined frequency range as disturbance torque components of the steering torque signal TsS.

Then, the input detector 262 obtains the extracted specified torque components of the steering torque signal TsS as torque components of the occupant's physical input Tp, i.e. an occupant's input signal Tp.

In particular, the input detector 262 includes, for example, a lowpass filter 262LF and an amplifier 26AM.

Specifically, the input detector 262 amplifies the specified torque components of the steering torque signal TsS whose specified frequency components are contained within the predetermined frequency range while reducing, from the steering torque signal TsS, the remaining torque components of the steering torque signal TsS, thus extracting the specified torque components of the steering torque signal TsS; the frequency components of the torque components are contained within the predetermined frequency range.

For example, the lowpass filter 262LF has a gain crossover frequency, i.e. a cut-off frequency, of 1 Hz, and the frequency range is set to be equal to or lower than the gain crossover frequency of 1 Hz.

That is, the input detector 262 passes the steering torque signal TsS measured by the torque sensor 39 through the lowpass filter 262LF to thereby obtain the specified torque components of the steering torque signal TsS, whose frequency components are equal to or lower than the gain crossover frequency of 1 Hz. Then, the input detector 262 causes the amplifier 262AM to amplify the specified torque components of the steering torque signal TsS, whose frequency components are equal to or lower than the gain crossover frequency of 1 Hz and that are passed through the lowpass filter 262LF.

That is, the predetermined frequency range is set as an occupant-inputtable frequency range whose maximum frequency is set to the gain crossover frequency of 1 Hz. This results in the specified torque components of the steering torque signal TsS, whose frequency components are within the occupant-inputtable frequency range. The specified frequency components of the steering torque signal TsS within the occupant-inputtable frequency range represent frequency components of the occupant's physical input Tp, that is, frequency components of torque generated by occupant's operation of the steering wheel 31.

That is, the gain crossover frequency of 1 Hz represents the maximum frequency of the occupant's inputtable frequency range, and the specified frequency components of the steering torque signal TsS are equal to or lower than the gain crossover frequency of 1 Hz.

The input detector 262 amplifies the specified torque components of the steering torque signal TsS, which have passed through the lowpass filter 262LF, using the amplifier 262AM by, for example, 20-fold, thus obtaining the amplified specified torque components of the steering torque signal TsS as the torque components of the occupant's physical input Tp.

Note that the remaining frequency components of the steering torque signal TsS other than the specified frequency components of the steering torque signal TsS will be referred to as disturbance frequency components of the steering torque signal TsS. The disturbance frequency components of the steering torque signal TsS represent frequency components of torque input to the steering shaft assembly 32 as the disturbance physical quantity.

The determiner 268 calculates the absolute values, which are assigned with reference character Tpa, of the torque components of the occupant's physical input Tp extracted by the input detector 262. Then, the determiner 268 compares the absolute values Tpa of the torque components of the occupant's physical input Tp with predetermined threshold torque Tref to thereby determine whether a driver occupant of the vehicle 10 is holding the steering wheel 31.

Values of the threshold torque Tref can be set to be different from each other depending on the respective conditions, such as shapes, of roads on which the vehicle 10 can travel.

That is, the determiner 268 can extract one of the prepared values of the threshold torque Tref; the extracted value of the threshold torque Tref matches with the condition of the road on which the vehicle 10 is travelling; the condition of the road can be obtained from measurement information sent from the millimeter-wave radars 12 and/or the image sensors 14. Then, the determiner 268 can compare the absolute values Tpa of the torque components of the occupant's physical input Tp extracted by the input detector 262 with the extracted value of the threshold torque Tref to thereby determining whether a driver occupant is holding the steering wheel 31.

Values of the threshold torque Tref can also be set to be different from each other depending on whether the turning angle controller 24 is operating in the automatic control mode. A value of the threshold torque Tref while the turning angle controller 24 is operating in the automatic control mode can be set to a value equal to or more than the absolute value of the steering torque Ts generated by a driver-occupant's grasping of the steering wheel 31, such as 0.3 newton-meters (Nm).

Alternatively, a value of the threshold torque Tref while the turning angle controller 24 is operating in the automatic control mode can be set to a value equal to or more than a value of the threshold torque Tref while the turning angle controller 24 is operating in the assist control mode. For example, a value of the threshold torque Tref while the turning angle controller 24 is operating in the automatic control mode can be set to be substantially ten-times larger than a value of the threshold torque Tref while the turning angle controller 24 is operating in the assist control mode.

The warning controller 28 instructs the warning device 40 to provide, to a driver occupant of the vehicle 10, visible and/or audible warning information indicative of urging a driver occupant of the vehicle 10 to hold the steering wheel 31 upon it being determined that a driver occupant is not holding the steering wheel 31. For example, the warning controller 28 instructs the warning device 40 to output beeper sounds upon it being determined that a driver occupant is not holding the steering wheel 31 if the warning device 40 is comprised of a buzzer.

Next, the following describes a cruise assist routine carried out by the CPU 21 of the cruise assist system 20 with reference to FIGS. 2 to 5. The CPU 21 can be programmed to start the cruise assist routine upon a switch for activating the cruise assist system 20 being turned on by an occupant or upon an ignition switch of the vehicle 10 being turned on by a driver occupant.

The CPU 21 can be programmed to execute the cruise assist routine every predetermined period. For example, the CPU 21 can be programmed to execute the cruise assist routine each time a value of the steering torque Ts measured by the torque sensor 39 is input to the cruise assist system 20, i.e., the CPU 21. Hereinafter, one cruise assist routine periodically performed by the CPU 21 will be referred to as a cycle.

Upon starting a current cycle of the cruise assist routine, the CPU 21 serves as the holding determiner 26 to determine whether the turning angle controller 24 is operating in the automatic control mode to thereby automatically adjust the turning angles of the respective front wheels 45 in step S5.

Upon it being determined that the turning angle controller 24 is not operating in the automatic control mode, i.e. is operating in the assist control mode (NO in step S5), the CPU 21 serves as the holding determiner 26 to perform a first holding determination task in step S10. That is, in step S10, the CPU 21 determines whether a driver occupant is holding the steering wheel 31 in accordance with at least a current value of the steering torque Ts measured by the torque sensor 39 at the start of the current cycle of the cruise assist routine.

Upon determining that a driver occupant is holding the steering wheel 31 ("HOLDING" in step S10), the CPU 21 terminates the current cycle of the cruise assist routine, and repeatedly carries out the next cycle of the cruise assist routine.

Otherwise, upon determining that a driver occupant is not holding the steering wheel 31 ("NOT HOLDING" in step S10), the CPU 21 serves as the warning controller 28 to cause the warning device 40 to provide, to a driver occupant of the vehicle 10, visible and/or audible warning information indicative of urging a driver occupant of the vehicle 10 to hold the steering wheel 31 in step S20.

On the other hand, upon it being determined that the turning angle controller 24 is operating in the automatic control mode (YES in step S5), the CPU 21 serves as the holding determiner 26 to perform a second holding determination task in step S30. That is, in step S30, the CPU 21 determines whether a driver occupant is holding the steering wheel 31 in accordance with at least the current value of the steering torque Ts measured by the torque sensor 39 at the start of the current cycle of the cruise assist routine.

Upon determining that a driver occupant is not holding the steering wheel 31 ("NOT HOLDING" in step S30), the CPU 21 terminates the current cycle of the cruise assist routine, and repeatedly carries out the next cycle of the cruise assist routine.

Otherwise, upon determining that a driver occupant is holding the steering wheel 31 ("HOLDING" in step S30), the CPU 21 serves as the holding determiner 26 to instruct the turning angle controller 24 to cancel the automatic control mode in step S40. Then, the CPU 21 serves as the cancelling unit 246 to cancel the automatic adjustment of the turning angles of the front wheels 45 in the automatic control mode in step S40.

Figure 3:
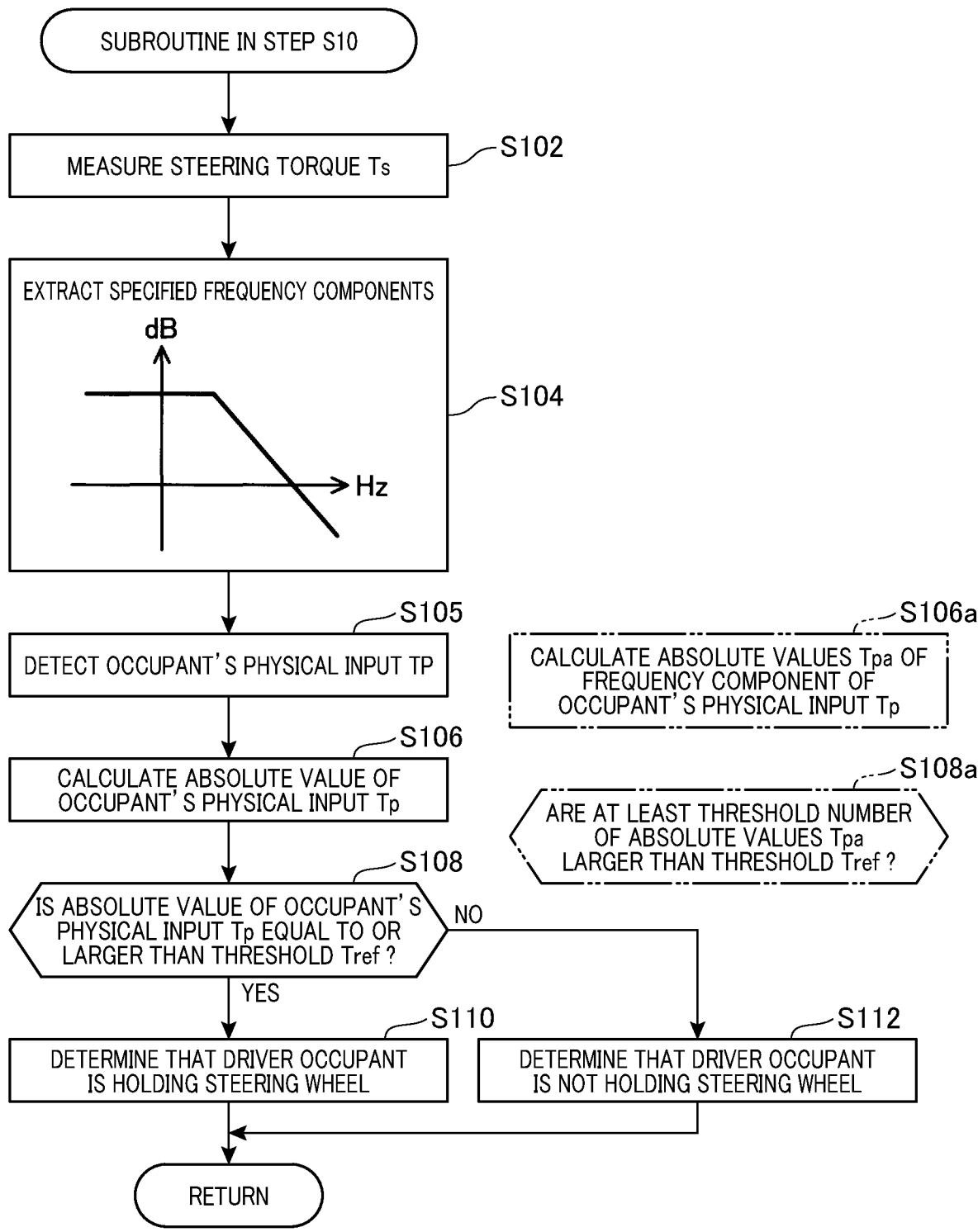
FIG. 3 is a flowchart schematically illustrating a subroutine of step S10 or S30 of FIG. 2.

FIG. 3 schematically illustrates the first holding determination task as a subroutine of the main cruise assist routine in step S10.

Specifically, in step S10, the CPU 21 serves as the input detector 262 to sample, as the steering torque signal TsS, at least the current value of the steering torque Ts measured by the torque sensor 39 at the start of the current cycle of the cruise assist routine in step S102.

In step S102, the CPU 21 can sample, as the steering torque signal TsS, the current value of the steering torque Ts measured by the torque sensor 39 at the start of the current cycle of the cruise assist routine, and the previous value of the steering torque Ts measured by the torque sensor 39 at the start of the immediately previous cycle of the cruise assist routine.

Then, the CPU 21 serves as the input device 262 to amplify specified frequency components of the steering torque signal TsS contained within the occupant-inputtable frequency range while attenuating the remaining frequency components of the steering torque signal Ts located outside the occupant-inputtable frequency range in step S104.

Figure 4:
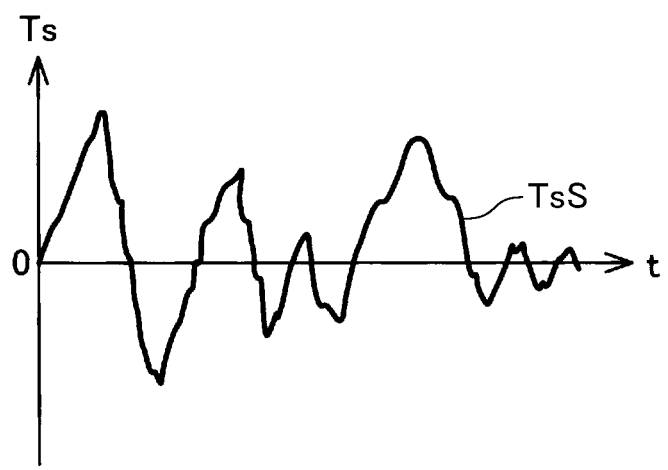
FIG. 4 is a graph schematically illustrating how a steering torque signal, which has not been processed by an input detector illustrated in FIG. 1, is changed over time.

Specifically, FIG. 4 illustrates that the steering torque signal TsS, which has not been processed by the input detector 262, contains the specified frequency components that are mainly generated by the occupant's input torque Tp and the disturbance frequency components, which are located outside the occupant-inputtable frequency range, other than the specified frequency components. The disturbance frequency components are higher in frequency than the specified frequency components.

For example, as described above, the CPU 21, which serves as the input detector 262, passes all the frequency components of the steering torque signal TsS through the lowpass filter 262LF to thereby extract the specified frequency components of the steering torque signal TsS while cutting off the disturbance frequency components of the steering torque signal TsS in step S104. Then, in step S104, the CPU 21 serves as the input detector 262 to amplify the extracted specified frequency components of the steering torque signal TsS, thus obtaining the amplified specified frequency components of the steering torque signal TsS in step S104.

That is, following the operation in step S104, the CPU 21 serves as the input detector 262 to detect the amplified specified frequency components of the steering torque signal TsS as an occupant's physical input signal, i.e. an occupant-input signal Tp, in step S105.

Figure 5:
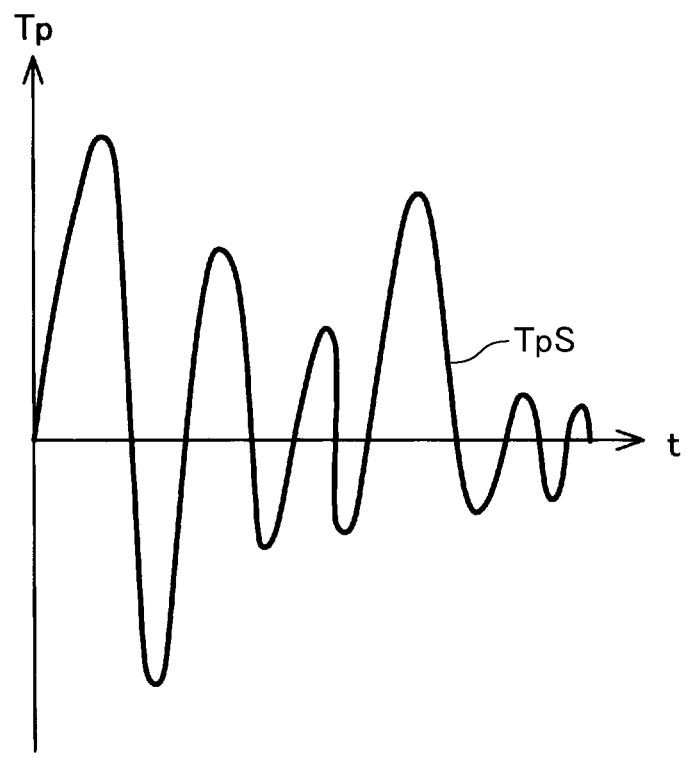
FIG. 5 is a graph schematically illustrating how an occupant-input signal constituted by frequency components of an occupant's physical input is changed over time.

FIG. 5 schematically illustrates the occupant-input signal TpS, constituted by the frequency components of the occupant's physical input Tp. Specifically, the occupant-input signal TpS detected by the input detector 262 shows that the specified frequency components of the steering torque signal TsS are amplified while the disturbance frequency components of the steering torque signal TsS are attenuated.

Following the operation in step S105, the CPU 21 serves as the determiner 268 to calculate the absolute value Tpa of the occupant's physical input signal Tp extracted in step S105 by the input detector 262 in step S106. Next, the CPU 21 serves as the determiner 268 to compare the absolute value Tpa of the occupant's physical input signal Tp with the threshold torque Tref to thereby determine whether the absolute value Tpa of the occupant's physical input Tp is equal to or larger than a threshold torque Tref in step S108.

Upon determining that the absolute value Tpa of the occupant-input signal Tp is equal to or larger than the threshold torque Tref (YES in step S108), the CPU 21 serves as the determiner 268 to determine that a driver occupant of the vehicle 10 is holding the steering wheel 31 in step S110, returning to the main routine illustrated in FIG. 3.

Otherwise, upon determining that the absolute value TPa of the occupant-input signal Tp is smaller than the threshold torque Tref (NO in step S108), the CPU 21 serves as the determiner 268 to determine that a driver occupant of the vehicle 10 is not holding the steering wheel 31 in step S112, returning to the main routine illustrated in FIG. 3. The threshold number is for example set to be equal to or higher than 1.

As a modification, the CPU 21 can serve as the input device 262 to convert the sampled values of the steering torque Ts, which constitute the steering torque signal TsS, into frequency components of the steering torque signal TsS using, for example, a predetermined Fourier transform algorithm in step S104.

In step S104, the CPU 21 can also serve as the input detector 262 to amplify specified frequency components of the steering torque signal TsS contained within the occupant-inputtable frequency range while attenuating the remaining frequency components of the steering torque Ts located outside the occupant-inputtable frequency range in step S104.

Following the operation in step S104, the CPU 21 can serve as the input detector 262 to detect the amplified specified frequency components of the steering torque signal TsS as the frequency components of the occupant's physical input Tp in step S105.

Following the operation in step S105, the CPU 21 can serve as the determiner 268 to calculate the absolute values Tpa of the frequency components of the occupant's physical input Tp extracted in step S105 by the input detector 262 in step S106*a*.

Next, the CPU 21 can serve as the determiner 268 to compare the absolute values Tpa of the frequency components of the occupant's physical input Tp with the threshold torque Tref to thereby determine whether at least a predetermined number of the absolute values Tpa of the frequency components of the occupant's physical input Tp are equal to or larger than the threshold torque Tref in step S108*a*.

Upon determining that at least the predetermined threshold number of the absolute values Tpa of the frequency components of the occupant's physical input Tp are equal to or larger than the threshold torque Tref (YES in step S108), the CPU 21 can serve as the determiner 268 to determine that a driver occupant of the vehicle 10 is holding the steering wheel 31 in step S110, returning to the main routine illustrated in FIG. 3.

Otherwise, upon determining that the number of absolute values TPa of the frequency components of the occupant's physical input Tp, which are equal to or larger than the threshold torque Tref, is equal to or smaller than the threshold number (NO in step S108), the CPU 21 can serve as the determiner 268 to determine that a driver occupant of the vehicle 10 is not holding the steering wheel 31 in step S112, returning to the main routine illustrated in FIG. 3. The threshold number is for example set to be equal to or higher than 1.

The second holding determination task in step S30 is substantially identical to the first holding determination task in step S10 except that a value of the threshold torque Tref used in step S108 or S108*a* of the second holding determination task is set to be higher than a value of the threshold torque Tref used in step S108 or S108a of the first holding determination task. This setting reduces the possibility of cancelling the automatic control mode by error without an actual instruction from the occupant.

As described above, the cruise assist system 20 according to the first embodiment includes the input detector 262. The input detector 262 amplifies the specified frequency components of the steering torque Ts contained within the occupant-inputtable frequency range while attenuating the remaining frequency components of the steering torque Ts located outside the occupant-inputtable frequency range, thus detecting the amplified specified frequency components of the steering torque Ts as the frequency components of the occupant's physical input Tp. This results in improvement of the accuracy of detecting the occupant's physical input Tp, because the frequency components of the steering torque Ts located outside the occupant-inputtable frequency range are probably frequency components due to the disturbance physical quantity.

The determiner 268 of the cruise assist system 20 is configured to determine whether a driver occupant is holding the steering wheel 31 based on the frequency components of the occupant's physical input Tp from which the disturbance physical quantity has been attenuated, making it possible to improve the accuracy of determining whether a driver occupant is holding the steering wheel 31.

The cruise assist system 20 of the first embodiment is capable of determining whether a driver occupant is holding the steering wheel 31 based on at least a current value of the steering torque Ts measured at the start of the current cycle of the cruise assist routine without using values of the steering torque Ts that were measured in the previous cycles of the cruise assist routine. That is, the cruise assist system 20 of the first embodiment is capable of extracting the specified frequency components of the steering torque signal TsS contained within the occupant-inputtable frequency range without using values of the steering torque Ts that were measured in the previous cycles of the cruise assist routine. This configuration therefore results in reduction of both (1) The amount of calculation required for extracting the torque components of the occupant's physical input Tp (2) The time required to determine whether a driver occupant is holding the steering wheel 31

Because the accuracy of determining whether a driver occupant is not holding the steering wheel 31 in the assist control mode becomes higher, it is possible to further improve (1) The accuracy of determining whether to output visible and/or audible warning information upon it being determined that a driver occupant is not holding the steering wheel 31 in the assist control mode (2) The accuracy of determining whether to cancel the automatic control mode Second Embodiment The following describes the second embodiment of the present disclosure with reference to FIGS. 6 to 12. The second embodiment differs from the first embodiment in the following points. So, the following mainly describes the different points, and omits or simplifies descriptions of like parts between the first and second embodiments, to which identical or like reference characters are assigned, thus eliminating redundant description.

A cruise assist system 20a installed in a vehicle 10a according to the second embodiment includes a holding determiner 26a. The holding determiner 26a is configured to perform a method of determining whether a driver occupant is holding the steering wheel 31, which is different from the method of determining whether a driver occupant is holding the steering wheel 31 carried out by the holding determiner 26 according to the first embodiment.

In addition, the cruise assist system 20a includes an environmental information table 292 stored in the memory 22 (see FIG. 7), which is different from the cruise assist system 20.

Before describing the configuration of the holding determiner 26a, the following schematically describes how the holding determiner 26a determines whether a driver occupant is holding the steering wheel 31 using FIG. 8.

While the turning angle controller 24 is operating in the automatic control mode, an occupant's grasp of the steering wheel 31 acts as resistance to turning of the upper steering shaft 32a.

That is, a response of turning of the upper steering shaft 32a to turning the torsion bar 32b by the motor 36 in the automatic control mode if the steering wheel 31 is not grasped by any occupant is faster than a response of turning of the upper steering shaft 32a to turning the torsion bar 32b by the motor 36 in the automatic control mode if the steering wheel 31 is grasped by any occupant.

From this viewpoint, let us consider a frequency response G as an input-output system model between the steering torque Ts being input to the input-output system and a steering angular velocity Ad of the steering wheel 31 as an output of the input-output system in response to the steering torque Ts. That is, the frequency response G between the steering torque Ts and the steering angular velocity Ad is changed depending on whether a driver occupant is holding the steering wheel 31.

That is, the holding determiner 26a is configured to determine whether a driver occupant is holding the steering wheel 31 based on the frequency response G of the input-output system; the frequency response G is changed depending on whether a driver occupant is holding the steering wheel 31.

Specifically, the holding determiner 26a is configured to estimate the frequency response G, i.e. model parameters of the frequency response G, between the steering torque Ts and the steering angular velocity Ad, which are second type physical quantities, more specifically, measurable physical quantities, according to the second embodiment, using system identification (see S500 in FIG. 8). In addition, the holding determiner 26a is configured to perform a determination method of the estimated frequency response G using the H-infinity norm and a threshold value to thereby determine whether a driver occupant is holding the steering wheel 31 (see step S502 in FIG. 8).

Figure 6:
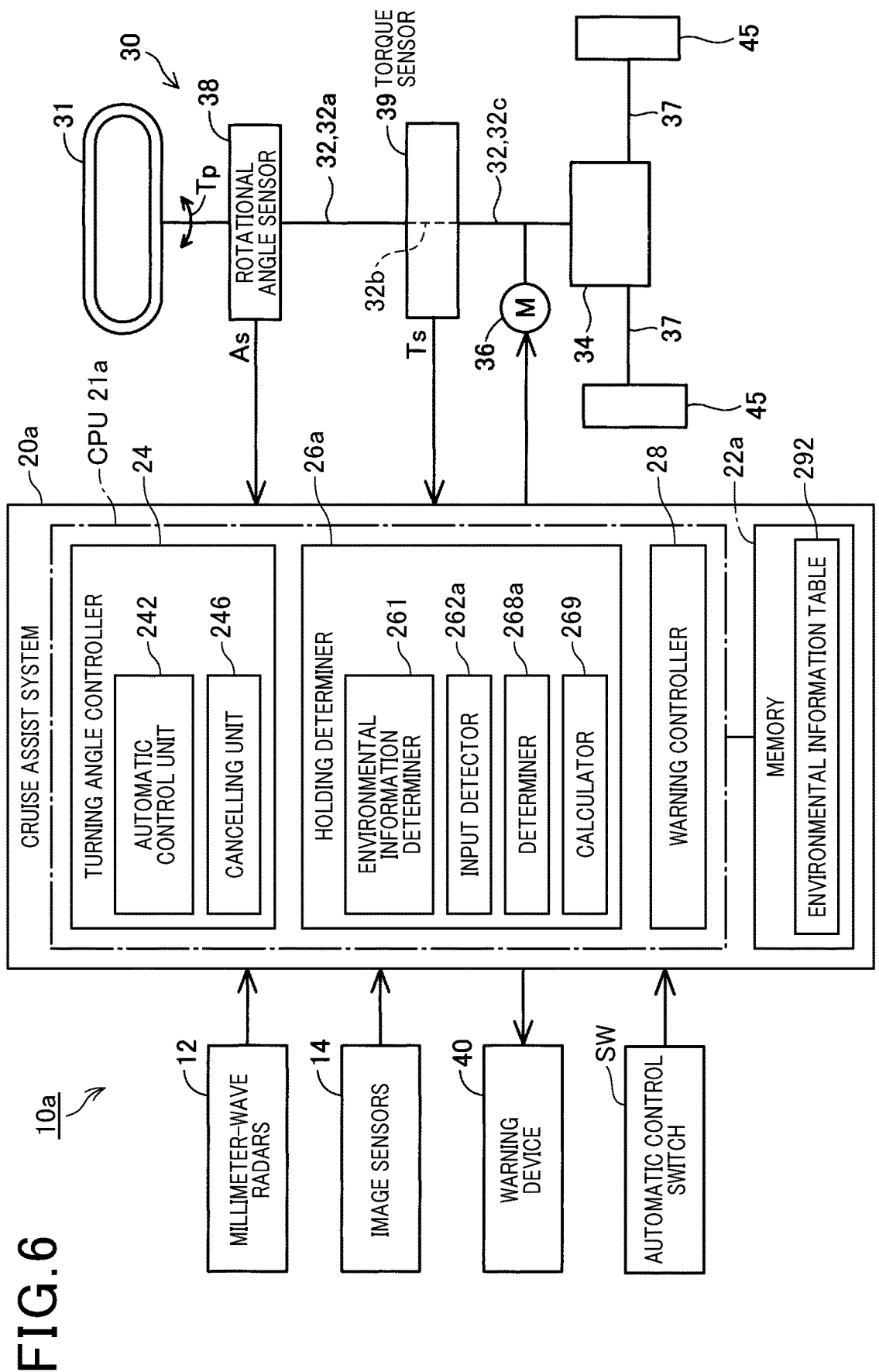
FIG. 6 is a block and circuit diagram schematically illustrating a system configuration of a vehicle in which a cruise assist system according to the second embodiment of the present disclosure is installed.

Referring to FIG. 6, the holding determiner 26a includes an environmental information determiner 261, an input detector 262a, a determiner 268a, and a calculator 269.

The environmental information determiner 261 is configured to determine, based on images captured by the image sensors 14 and obtained from the image sensors 14, whether the road on which the vehicle 10a is travelling has a substantially linear shape or a curved shape as an example of environmental information around the vehicle 10a.

For example, the environmental information determiner 261 determines whether the road on which the vehicle 10a is travelling has a substantially linear shape or a curved shape in accordance with the following procedure.

First, the environmental information determiner 261 obtains an image of the front region ahead of the vehicle sequentially captured by the corresponding image sensor 14. Then, the environmental information determiner 261 performs a known lane-marking line detection task based on the obtained image of the front region to thereby detect a lane marking line that partitions the travelling lane of the vehicle 10a in the road.

Next, the environmental information determiner 261 calculates the curvature of the lane marking line, i.e. curvature of the travelling lane of the vehicle 10a, and determines whether the calculated curvature of the lane marking line is larger than a predetermined curvature threshold.

Upon determining that the calculated curvature of the lane marking line is larger than the predetermined curvature threshold, the environmental information determiner 261 determines that the road on which the vehicle 10a is travelling has a curved shape. Otherwise, upon determining that the calculated curvature of the lane marking line is equal to or smaller than the predetermined curvature threshold, the environmental information determiner 261 determines that the road on which the vehicle 10a is travelling has a substantially linear shape.

If there are center and outer line marking lines on the road for partitioning the corresponding lane in the road, the environmental information determiner 261 can calculate the curvature of at least one of the lane marking lines, and determine whether the calculated curvature of the at least one of the lane marking lines is larger than the predetermined curvature threshold.

If the vehicle 10a includes a global positioning system (GPS) sensor, the GPS sensor receives GPS signals from GPS satellites, and determines the current location of a predetermined point, such as the center of gravity, of the vehicle 10a based on the GPS signals. If map data indicative of diagrammatic representation of the areas through which the vehicle 10a can travel is stored in the memory 22, the environmental information determiner 261 can determine whether the road on which the vehicle 10a is travelling has a substantially linear shape or a curved shape in accordance with the current location of the vehicle 10a and the map data. The map data can include, for each lane, information indicative of whether the corresponding lane has a substantially linear shape or a curved shape.

The calculator 269 is configured to differentiate the rotational angle As to thereby calculate the steering angular velocity Ad.

The input detector 262a is configured to detect the occupant's physical input Tp based on the second type physical quantities depending on the rotational motion of the steering shaft assembly 32 during execution of the automatic control mode. As described above, the second physical quantities are physical quantities having a physical relationship therebetween; the physical relationship is changed depending on whether the occupant's physical input Tp is being applied to the steering wheel 31. The second physical quantities according to the second embodiment include the steering torque Ts and the steering angular velocity As.

In particular, the input detector 262a is configured to estimate the frequency response G serving as the input-output system between the second type physical quantities, and determine whether the occupant's physical input Tp is being applied to the steering wheel 31 as a function of the frequency response G.

For example, the input detector 262a according to the second embodiment is configured to compare the frequency response G between the steering torque Ts and the steering angular velocity Ad with a predetermined threshold to thereby determine whether the occupant's physical input Tp is being applied to the steering wheel 31.

The frequency response G between the steering torque Ts that is an input parameter and the steering angular velocity Ad that is an output parameter according to the second embodiment is described by an ARX model. That is, the input detector 26a identifies the ARX model using a suitable system identification algorithm to thereby estimate the input-output system, i.e. the frequency response G, between the steering torque Ts that is an input parameter and the steering angular velocity Ad. The input detector 26a can select one of various system identification algorithms including (1) A forgetting factor adaptation algorithm using a forgetting factor A as its parameter (see FIG. 7)

(2) A Kalman filter adaptation algorithm using a Kalman filter with a Kalman gain as its parameter (3) A normalized/unnormalized gradient adaptation algorithm using an adaptation gain as its parameter In particular, the input determiner 262a of the second embodiment is configured to perform the forgetting factor adaptation algorithm using the forgetting factor A to thereby estimate the frequency response G.

Additionally, the input determiner 262a is configured to identify the frequency response G while changing a value of the forgetting factor A as a function of the environmental information that has a potential to impact on the frequency response G.

Specifically, let us consider a first case where the environmental information shows a smaller temporal change of each of the second type physical quantities, and a second case where the environmental information shows a greater temporal change of each of the second type physical quantities.

At that time, it is preferable that the input determiner 262a uses a first value of the forgetting factor A for the first case, and a second value of the forgetting factor A for the second case; the first value of the forgetting factor A enables higher-accuracy system identification with respect to the temporal change of each of the second type physical quantities to be carried out than the second value of the forgetting factor A does.

For example, the input determiner 262a according to the second embodiment is configured to identify (1) The frequency response G using a larger value of the forgetting factor A for the case where the road on which the vehicle 10a is travelling has a smaller value of curvature so that the road has a substantially linear shape (2) The frequency response G using a smaller value of the forgetting factor A for the case where the road on which the vehicle 10a is travelling has a larger value of curvature so that the road has a curved shape If the road on which the vehicle 10a is travelling has a substantially linear shape, the temporal change of each of the steering torque Ts and the steering angular velocity Ad is estimated to be smaller. For this reason, setting a value of the forgetting factor A for the case where the road has a substantially linear shape to be larger than a value of the forgetting factor A for the case where the road has a curved shape enables higher accuracy system identification over time to be carried out.

The environmental information table 292 stored in the memory 22 includes information representing a correlation between each of the road shapes and a corresponding value of the forgetting factor A. For example, as illustrated in FIG. 7, the information stored in the environmental information table 292 represents a value A1 of the forgetting factor A for the case where the road shape is determined as a substantially linear shape, and a value A2 of the forgetting factor A for the case where the road shape is determined as a substantially curved shape; the value A1 of the forgetting factor A is larger than the value A2 of the forgetting factor A.

Referring to FIG. 8, the input detector 262a is configured to determine whether the occupant's physical input Tp is being applied to the steering wheel 31 in accordance with a predetermined weighting function W in addition to the frequency response G. The weighting function W can be determined based on (i) parameters associated with the vehicle 10a, such as the appearance and weight of the vehicle 10a, and (ii) the environmental information including information about the situation of the road surface, such as information indicative of whether the road surface is icy.

Specifically, the input detector 262a is configured to calculate the H-infinity norm of the product (WG) of the frequency response G and the weighting function W, which is expressed as "$\|WG\|_\infty$". Then, the input detector 262a is configured to determine whether the calculated H-infinity norm $\|WG\|_\infty$ is equal to or lower than the predetermined threshold of, for example, 1. That is, the input detector 262a is equivalently configured to determine whether the gain |G| of the frequency response G is equal to or lower than the gain of the reciprocal, which is expressed as $W^{-1}$, of the weighting function W. In other words, this means, in the gain characteristics of the gain |G| of the frequency response G, whether there is a region that is equal to or smaller than the gain of the reciprocal $W^{-1}$ of the weighting function W.

Upon determining that the H-infinity norm $\|WG\|_\infty$ is equal to or lower than 1, the input detector 262a determines that the occupant's physical input Tp is being applied to the steering wheel 31.

Otherwise, upon determining that the H-infinity norm $\|WG\|_\infty$ is higher than 1, the input detector 262a determines that no occupant's physical input Tp is being applied to the steering wheel 31.

Next, the following describes a cruise assist routine carried out by the CPU 21a of the cruise assist system 20a with reference to FIGS. 9 to 12. The CPU 21a can be programmed to start the cruise assist routine in response to start of the automatic control mode as a trigger.

The CPU 21a can be programmed to execute the cruise assist routine every predetermined period. For example, the CPU 21a can be programmed to execute the cruise assist routine each time a value of the steering torque Ts measured by the torque sensor 39 is input to the cruise assist system 20a, i.e., the CPU 21a. Hereinafter, one cruise assist routine periodically performed by the CPU 21a will be referred to as a cycle.

Upon starting a current cycle of the cruise assist routine, the CPU 21a serves as the holding determiner 26a to perform a holding determination operation to determine whether a driver occupant is holding the steering wheel 31 in step S10a (see FIG. 9).

Upon determining that a driver occupant is holding the steering wheel 31 (YES in step S10a), the CPU 21a serves as the holding determiner 26a to instruct the turning angle controller 24 to cancel the automatic control mode in step S40. Then, the CPU 21a serves as the cancelling unit 246 to cancel the automatic adjustment of the turning angles of the front wheels 45 in the automatic control mode in step S40.

Otherwise, upon determining that a driver occupant is not holding the steering wheel 31 (NO in step S10a), the CPU 21a terminates the current cycle of the cruise assist routine, and repeatedly carries out the next cycle of the cruise assist routine.

Figure 10:
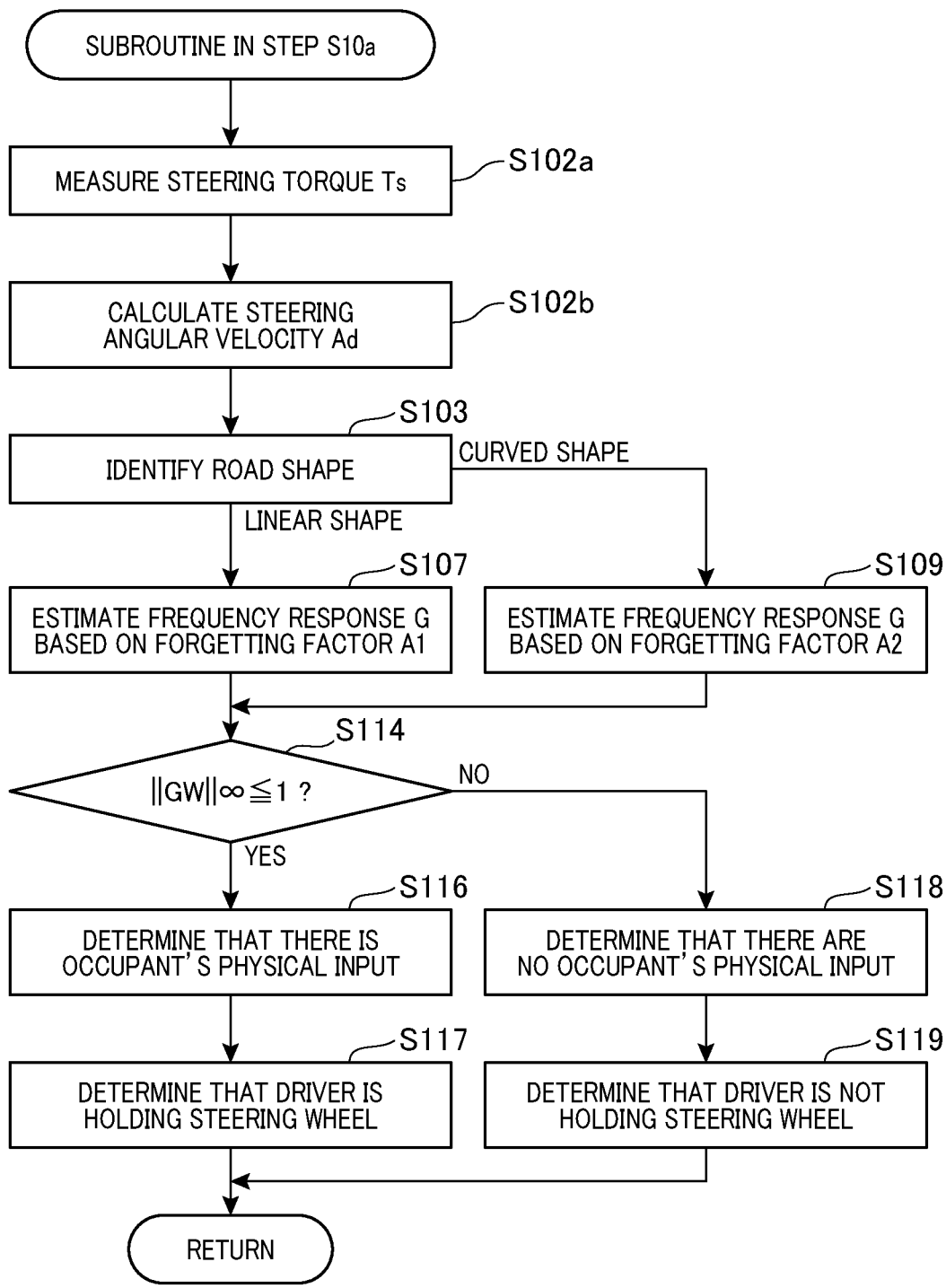
FIG. 10 is a flowchart schematically illustrating a subroutine of step S10a of FIG. 9.

FIG. 10 schematically illustrates a subroutine of the operation in step S10a of the main cruise assist routine.

Specifically, in step S102a, the CPU 21a serves as the input detector 262a to sample values of the steering torque Ts that have been measured by the torque sensor 39 since the start of the current cycle of the cruise assist routine in step S102a.

Next, the CPU 21a serves as the input detector 262 to sample values of the rotational angle As that have been measured by the rotational-angle sensor 38 since the start of the current cycle of the cruise assist routine in step S102b. Then, the CPU 21a differentiates sampled values of the rotational angle As to thereby calculate respective values of the steering angular velocity Ad.

Following the operation in step S102b, the CPU 21a serves as the environmental information determiner 261 to determine, based on images captured by the image sensors 14 and obtained from the image sensors 14, whether the road on which the vehicle 10a is travelling has a substantially linear shape or a curved shape in step S103. The procedure of the operation in step S103 has been described above.

Upon determining that the road on which the vehicle 10a is travelling has a substantially linear shape, the CPU 21a serves as the input detector 262a to extract the value A1 of the forgetting factor A. Then, the CPU 21a serves as the input detector 262a to estimate the frequency response G as a function of the value A1 of the forgetting factor A using the sampled values of the steering torque Ts and the values of the steering angular velocity Ad described above in step S107.

Otherwise, upon determining that the road on which the vehicle 10a is travelling has a curved shape, the CPU 21a serves as the input detector 262a to extract the value A2 of the forgetting factor A. Then, the CPU 21a serves as the input detector 262a to estimate the frequency response G as a function of the value A2 of the forgetting factor A using the sampled values of the steering torque Ts and the values of the steering angular velocity Ad described above in step S109.

Next, the CPU 21a serves as the input detector 262a to calculate the H-infinity norm $\|WG\|_\infty$ of the product (WG) of the frequency response G and the weighting function W, and to determine whether the H-infinity norm $\|WG\|_\infty$ is equal to or lower than 1 in step S114.

Figure 11:
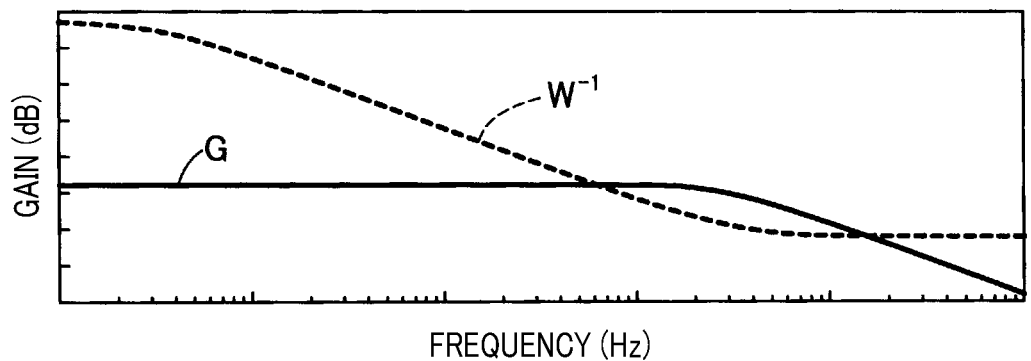
FIG. 11 is a gain characteristic curve of a Bode diagram upon no occupant's physical input being applied to the steering wheel.
Figure 12:
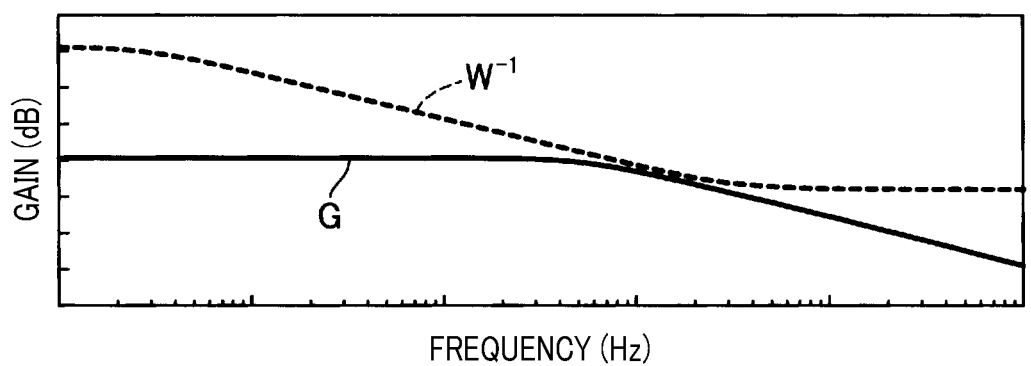
FIG. 12 is a gain characteristic curve of a Bode diagram upon an occupant's physical input being applied to the steering wheel.

The following describes how the determination in step S114 is carried out with reference to Bode diagrams of respective FIGS. 11 and 12.

FIG. 11 shows that there is a region of a gain characteristic curve of the frequency response G, which is higher than the curve of the gain of the reciprocal $W^{-1}$ of the weighting function W, upon so that the H-infinity norm $\|WG\|_\infty$ is higher than 1.

In contrast, FIG. 12 shows that there are no regions of a gain characteristic curve of the frequency response G, which are higher than the curve of the gain of the reciprocal $W^{-1}$ of the weighting function W, the occupant's physical input Ap being applied to the steering wheel 31, so that the H-infinity norm $\|WG\|_\infty$ is equal to or lower than 1.

Upon determining that the H-infinity norm $\|WG\|_\infty$ is equal to or lower than 1 (YES in step S114), the CPU 21a serves as the input detector 262a to determine that the occupant's physical input Tp is being applied to the steering wheel 31 in step S116. Then, the CPU 21a serves as the determiner 268a to determine that a driver occupant is holding the steering wheel 31 in step S117, returning to the main routine illustrated in FIG. 9.

Otherwise, upon determining that the H-infinity norm $\|WG\|_\infty$ is higher than 1 (NO in step S114), the CPU 21a serves as the input detector 262a to determine that no occupant's physical input Tp is being applied to the steering wheel 31 in step S118. Then, the CPU 21a serves as the determiner 268a to determine that a driver occupant is not holding the steering wheel 31 in step S119, returning to the main routine illustrated in FIG. 9.

As described above, the cruise assist system 20a according to the second embodiment is configured to determine whether the occupant's physical input Ap is being applied to the steering wheel 31 based on at least two second type physical quantities having a physical relationship that is changed depending on whether the occupant's physical input Tp is being applied to the steering wheel 31. This configuration therefore results in a higher accuracy of determining whether the occupant's physical input Ap is being applied to the steering wheel 31, resulting in improvement of the accuracy of determining whether a driver occupant is holding the steering wheel 31 based on the result of determining whether the occupant's physical input Ap is being applied to the steering wheel 31.

The cruise assist system 20a of the second embodiment is configured to determine whether a driver occupant is holding the steering wheel 31 based on the values of the steering torque Ts that have been measured since the start of the current cycle of the cruise assist routine and the values of the rotational angle As that have been measured since the start of the current cycle of the cruise assist routine. This configuration therefore results in reduction of the time required to determine whether a driver occupant is holding the steering wheel 31.

MODIFICATIONS

First Modification

The input detector 262 of the first embodiment includes the lowpass filter 262LF that attenuates the frequency components of the steering torque Ts located outside the occupant-inputtable frequency range, but the present disclosure is not limited thereto.

Specifically, the input detector 262 of the first embodiment can include a bandpass filter for extracting the specified frequency components of the steering torque Ts contained within the occupant-inputtable frequency range. The bandpass filter of the input detector 262 can be configured to pass therethrough only the specified frequency components of the steering torque Ts contained within the occupant-inputtable frequency range. For example, the bandpass filter can be configured to have an upper cutoff frequency of 1 Hz and a lower cutoff frequency of 0.1 Hz.

Second Modification

The cruise assist system 20 according to the first embodiment uses the steering torque Ts as the first type physical quantity, but the present disclosure is not limited thereto. Specifically, other physical quantities depending on rotational movement of the steering-shaft assembly 32 can be used as the first type physical quantity as long as the other physical quantities are caused by both the occupant's physical input Tp and the disturbance input applied to the steering wheel 31, i.e. the steering shaft assembly 32. For example, measurement values measured by various sensors and calculation values calculated based on the measurement values can be used as the first type physical quantities as long as the measurement values are caused by both the occupant's physical input Tp and the disturbance input applied to the steering wheel 31, i.e. the steering shaft assembly 32.

Note that "a physical quantity" is a physical property of a phenomenon, body, or substance, which can be quantified by measurement and/or calculation.

The measurement values other than the steering torque Ts include, for example, the rotational angle As, the turning angle of each front wheel 45, a current value measured by a sensor and sent to the cruise assist system 20, and a voltage value measured by a sensor and sent to the cruise assist system 20. The calculation values include, for example, the steering angular velocity Ad calculated by the rotational angle As and values calculated by the current and voltage values sent from the corresponding sensors.

Third Modification

The cruise assist system 20a according to the second embodiment uses the steering torque Ts and the steering angular velocity Ad, which are measurable physical quantities each depending on the rotational motion of the steering shaft assembly 32; the steering torque Ts and the steering angular velocity Ad have a physical relationship that is changed depending on whether the occupant's physical input Tp is being applied to the steering wheel 31. The present disclosure is however not limited to the steering torque Ts and the steering angular velocity Ad as the second type physical quantities.

Specifically, a current value supplied to the motor 36, an angular velocity of the motor 36, or an angular velocity of at least one of the front wheels 45 can be used as one of the second type physical quantities in place of the steering angular velocity Ad.

Additionally, a target turning-angle value for the turning angle of each front wheel 45 in the automatic control mode can be used as one of the second type physical quantities in place of the steering angular velocity Ad; a value of the turning angle of each front wheel 45 is used as a controlled variable in the automatic control mode. A target current value supplied to the motor 36 in the automatic control mode can be used as one of the second type physical quantities in place of the steering angular velocity Ad; the current value supplied to the motor 36 is used as a controlled variable in the automatic control mode.

If the torque sensor 39 includes a resolver, a rotational angular velocity of the upper steering shaft 32a and a rotational angular velocity of the lower steering shaft 32c measured by the resolver can be used as the second type physical quantities.

The cruise assist system 20a according to the second embodiment can be configured to determine whether the occupant's physical input Ap is being applied to the steering wheel 31 based on at least three second type physical quantities having physical relationships that are changed depending on whether the occupant's physical input Tp is being applied to the steering wheel 31.

For example, the CPU 21a can estimate a first input-output system, such as a first frequency response, between the steering torque Ts as its input and the steering angular velocity Ad as its output in step S107 or S109. Additionally, the CPU 21a can estimate a second input-output system, such as a second frequency response, between the steering torque Ts as its input and a current value supplied to the motor 36 as its output in step S107 or S109.

Then, the CPU 21a can determine that the occupant's physical input Tp is being applied to the steering wheel 31 in step S116 upon determining that each of the first and second input-output systems satisfies a condition representing that the occupant's physical input Ap is being applied to the steering wheel 31. This enables the accuracy of determining whether the occupant's physical input Tp is being applied to the steering wheel 31 to be further improved.

Fourth Modification

The cruise assist system 20a according to the second embodiment is configured to change a value of the forgetting factor A that serves as a parameter of the system identification algorithm in accordance with the environmental information, but the present disclosure is not limited to this configuration.

Specifically, the cruise assist system 20a can be configured to identify the input-output system between the steering torque Ts as its input and the steering angular velocity Ad as its output in accordance with a constant value of the parameter of the system identification algorithm. In addition, the cruise assist system 20a can be configured to change a selected one of the system identification algorithms in accordance with the environmental information.

For example, the CPU 21a can be configured to estimate the input-output system between the steering torque Ts as its input and the steering angular velocity Ad as its output using (1) The forgetting factor adaptation algorithm if the road has a substantially linear shape in step S107

(2) The Kalman filter adaptation algorithm if the road has a curved shape

In addition, the cruise assist system 20a according to the second embodiment can be configured to change (1) A value of the parameter that serves as a parameter of system identification algorithm in accordance with the environmental information (2) A selected one of the system identification algorithms in accordance with the environmental information Specifically, let us consider a first case where the environmental information shows a smaller temporal change of each of the second type physical quantities, and a second case where the environmental information shows a greater temporal change of each of the second type physical quantities.

At that time, it is preferable that the input determiner 262a can change at least one of a value of the parameter and a selected one of the system identification algorithms to thereby enable higher-accuracy system identification with respect to the temporal change of each of the second type physical quantities for the first case to be carried out than system identification for the second case.

Moreover, the cruise assist system 20a can be configured to use information indicative of curvature of the road on which the vehicle 10a is travelling as the environment information, but the present disclosure is not limited to this configuration.

Specifically, the cruise assist system 20a can be configured to use, as the environmental information, another information that has an impact on the input-output relationship between the at least two second type physical quantities. For example, the environmental information can include at least one of (1) Information indicative of curvature of the road on which the vehicle 10a is travelling (2) Information indicative of the degree of irregularities of the road (3) Information indicative of the gradient of the road (4) Information indicative of the friction coefficient of the road surface, such as information indicative of whether the road surface is icy (5) Information indicative of at least one of obstacles, such as other vehicles, bicycles, and pedestrians, located around the vehicle 10a For example, analyzing the images captured by the image sensors 14 enable these items of information included in the environmental information to be obtained.

For example, the CPU 21a can use the value A2 of the forgetting factor A, which is smaller than the value A1, in step S109 if the gradient of the road is smaller than a predetermined threshold (see step S103), and can use the value A1 of the forgetting factor A in step S107 if the gradient of the road is equal to or larger than the predetermined threshold (see step S103).

Fifth Modification

The cruise assist system 20a according to the second embodiment uses at least two second type physical quantities to thereby determine whether the occupant's physical input Tp is being applied to the steering wheel 31 during execution of the automatic control mode. The present disclosure is however not limited to this configuration.

Specifically, the cruise assist system 20a can use at least two second type physical quantities to thereby determine whether the occupant's physical input Tp is being applied to the steering wheel 31 while the automatic control mode is not being carried out.

Even if the automatic control mode is not being carried out, it is possible for the cruise assist system 20a to determine whether the occupant's physical input Tp is being applied to the steering wheel 31, because the second physical quantities have a physical relationship, i.e. a frequency response, therebetween; the physical relationship is changed depending on whether the occupant's physical input Tp is being applied to the steering wheel 31.

For example, upon determining that no occupant's physical input Tp is being applied to the steering wheel 31 in the assist control mode, the cruise assist system 20a can be configured to instruct the warning device 40 to output visible and/or audible warning information, which is similar to the first embodiment.

Sixth Modification

The cruise assist system 20a according to the second embodiment is configured to cancel the automatic adjustment of the turning angles of the front wheels 45 in the automatic control mode upon determining that a driver occupant of the vehicle 10 is holding the steering wheel 31 (see step S40 in FIG. 9), but the present disclosure is not limited to this configuration.

Specifically, the cruise assist system 20a can be configured to perform an operation for addressing a case where a driver occupant has been holding the steering wheel 31 for safety in the automatic control mode.

For example, upon determining that a driver occupant is holding the steering wheel 31 (YES in step S10a), the CPU 21a can terminate the cruise assist routine (see two-dot chain line L1 in FIG. 9) without cancelling the automatic control mode, and can repeatedly carry out the next cycle of the cruise assist routine.

On the other hand, upon determining that a driver occupant is not holding the steering wheel 31 (NO in step S10a), the CPU 21*a* can serve as the cancelling unit 246 to cancel the automatic adjustment of the turning angles of the front wheels 45 in the automatic control mode in step S40 (see two-dot chain line L2 in FIG. 9). In step S40, the CPU 21*a* can serve as the warning controller 28 to instruct the warning device 40 to provide, to a driver occupant of the vehicle 10*a*, visible and/or audible warning information indicative of urging a driver occupant of the vehicle 10 to hold the steering wheel 31.

While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiments and their modifications can be replaced with a known structure having the same function as the corresponding technical feature. Each of the technical features described in the embodiments and their modifications can also be combined with at least one of the other technical features. At least one of the technical features described in the embodiments and their modifications can further be eliminated unless the at least one of the technical features is described as an essential element in the present specification.

What is claimed is:

1. A cruise assist system for a vehicle including a steering wheel and a steering shaft coupled to the steering wheel, the cruise assist system comprising:
   a turning angle controller configured to execute an automatic cruise control task that automatically controls a turning angle of the vehicle in an automatic control mode; and
   a holding determiner configured to determine whether an occupant is holding the steering wheel based on the occupant's physical input to the steering shaft that is caused by the occupant's operation of the steering wheel,
   the holding determiner comprising:
      an input detector configured to detect the occupant's physical input to the steering shaft based on at least one of a first physical quantity and second physical quantities, in which the first physical quantity and the second physical quantities define rotational movement of the steering shaft,
      the first physical quantity comprising the occupant's physical input and a disturbance input to the steering shaft, the disturbance input being different from the occupant's physical input, and
      the second physical quantities having a relationship therebetween, the relationship changing in response to rotational movement of the steering shaft caused by the occupant's physical input, wherein
   when detecting the occupant's physical input to the steering shaft based on the first physical quantity, the input detector is configured to detect the occupant's physical input by removing the disturbance input from the first physical quantity,
   when detecting the occupant's physical input to the steering shaft based on the second physical quantities, the input detector is configured to detect the occupant's physical input based on the relationship between the second physical quantities,
   the holding determiner further comprises, when the first physical quantity is used by the input detector, a determiner configured to:
      perform a comparison of the occupant's physical input with a predetermined threshold; and
      determine whether the occupant is holding the steering wheel in accordance with a result of the comparison, and
   a value of the predetermined threshold during execution of the automatic cruise control task being set to be larger than a value of the predetermined threshold during no execution of the automatic cruise control task.

2. The cruise assist system according to claim 1, wherein the first physical quantity has frequency components, and
   wherein, when using the first physical quantity, the input detector is configured to:
      extract, from the first physical quantity, specific frequency components of the first physical quantity, the specific frequency components being within a predetermined frequency range;
      amplify the specific frequency components of the first physical quantity while reducing other frequency components of the first physical quantity to thereby extract the specific frequency components of the first physical quantity, the other frequency components being outside the predetermined frequency range; and
      detect the extracted specific frequency components of the first physical quantity as the occupant's physical input.

3. The cruise assist system according to claim 2, wherein the predetermined frequency range is set as an occupant-inputtable frequency range, the occupant-inputtable frequency range representing frequency components of the first physical quantity generatable by the occupant's operation of the steering wheel.

4. The cruise assist system according to claim 1, wherein the holding determiner further comprises, when the first physical quantity is used by the input detector, a determine configured to:
   perform a comparison of the occupant's physical input with a predetermined threshold; and
   determine whether the occupant is holding the steering wheel in accordance with a result of the comparison.

5. The cruise assist system according to claim 1, wherein, when using the second physical quantities, the input detector is configured to:
   perform system identification of an input-output system between two selected second physical quantities from the second physical quantities to thereby estimate the input-output system as the relationship, one of the two selected second physical quantities being input to the input-output system as an input physical quantity, the other of the two selected second physical quantities being output from the input-output system as an output physical quantity; and
   detect the occupant's physical input based on the estimated input-output system.

6. The cruise assist system according to claim 5, wherein, when using the second physical quantities, the input detector is configured to:
   perform the system identification of the input-output system using a selected one of system identification algorithms, each system identification algorithms including at least one parameter; and
   change, based on environmental information that has a potential to impact on the input-output system, at least one of:

one of the system identification algorithms that has been selected to another one of the system identification algorithms; and a value of the at least one parameter used by the selected one of the system identification algorithms to another value.

7. The cruise assist system according to claim 6, wherein the environmental information includes at least one of:

information indicative of a curvature of a road on which the vehicle is travelling;

information indicative of a degree of irregularities of the road;

information indicative of a gradient of the road;

information indicative of a friction coefficient of a surface of the road; and information indicative of at least one of obstacles located around the vehicle.

8. The cruise assist system according to claim 5, wherein:

the input-output system is estimated by the input detector as a frequency response; and the input detector comprises a determiner configured to:

perform a comparison of the frequency response with a predetermined threshold; and determine whether the occupant's physical input being applied to the steering wheel in accordance with a result of the comparison.

9. The cruise assist system according to claim 8, wherein the holding determiner further comprises a second determine configured to:

determine that the occupant is holding the steering wheel upon it being determined that the occupant's physical input is being applied to the steering wheel; and determine that the occupant is not holding the steering wheel upon it being determined that no occupant's physical input is being applied to the steering wheel.

10. The cruise assist system according to claim 1, wherein:

the first physical quantity includes at least one of a measurement value measured by a sensor and depending on rotational movement of the steering shaft, and a calculation value calculated by the measurement value; and the second physical quantities include at least one of a measurement value measured by a sensor and depending on rotational movement of the steering shaft, a calculation value calculated by the measurement value, and a target value for a controlled variable used by the automatic cruise control task.

11. The cruise assist system according to claim 1, further comprising:

a warning device configured to provide, to the occupant, warning information indicative of urging the occupant to hold the steering wheel upon it being determined that the occupant is not holding the steering wheel.

12. The cruise assist system according to claim 1, further comprising:

a cancelling unit configured to cancel execution of the automatic cruise control task upon it being determined that the occupant is not holding the steering wheel.

13. The cruise assist system according to claim 1, wherein the second physical quantities include two second physical quantities, one of the two second physical quantities being an input physical quantity being input to the steering shaft, the other of the two second physical quantities being an output physical quantity representing a rotational output of the steering shaft caused by the input physical quantity being input to the steering shaft.

14. A cruise assist method for a vehicle configured to automatically control a turning angle of the vehicle in an automatic control mode and including a steering wheel and a steering shaft coupled to the steering wheel, the cruise assist method comprising:

detecting an occupant's physical input to the steering shaft via the occupant's operation of the steering wheel based on at least one of a first physical quantity and second physical quantity, each of the first and second physical quantities defining rotational movement of the steering shaft, the first physical quantity comprising the occupant's physical input and a disturbance input to the steering shaft, the disturbance input being different from the occupant's physical input, a rotational movement of the steering shaft being caused due to an occurrence of the first physical quantity, and the second physical quantities having a relationship therebetween, the relationship being changed due to a rotational movement of the steering shaft that is caused by the occupant's physical input; and determining whether the occupant is holding the steering wheel in accordance with the occupant's physical input, wherein detecting the occupant's physical input to the steering shaft based on the first physical quantity includes reducing the disturbance input from the first physical quantity to obtain a remaining physical quantity as the occupant's physical input, detecting the occupant's physical input to the steering shaft based on the second physical quantities includes detecting the occupant's physical input based on the relationship between the second physical quantities, detecting the occupant's physical input to the steering shaft based on the first physical quantity includes:

performing a comparison of the occupant's physical input with a predetermined threshold; and determining whether the occupant is holding the steering wheel in accordance with a result of the comparison, and a value of the predetermined threshold during execution of automatic control the turning angle of the vehicle in the automatic control mode being set to be larger than a value of the predetermined threshold during no execution of the automatic control the turning angle of the vehicle in the automatic control mode.

15. The cruise assist method according to claim 14, wherein the first physical quantity has frequency components, and when using the first physical quantity, detecting the occupant's physical input to the steering shaft further comprises:

extracting, from the first physical quantity, specific frequency components of the first physical quantity, the specific frequency components being within a predetermined frequency range;

amplifying the specific frequency components of the first physical quantity while reducing other frequency components of the first physical quantity to thereby extract the specific frequency components of the first physical quantity, the other frequency components being outside the predetermined frequency range; and detecting the extracted specific frequency components of the first physical quantity as the occupant's physical input.

16. The cruise assist method according to claim 15, wherein the predetermined frequency range is set as an occupant-inputtable frequency range, the occupant-inputtable frequency range representing frequency components of the first physical quantity generatable by the occupant's operation of the steering wheel.

17. The cruise assist method according to claim 14, wherein detecting the occupant's physical input to the steering shaft based on the first physical quantity further comprises:
performing a comparison of the occupant's physical input with a predetermined threshold; and
determining whether the occupant is holding the steering wheel in accordance with a result of the comparison.

18. The cruise assist method according to claim 14, wherein detecting the occupant's physical input to the steering shaft based on the second physical quantities further comprises:
performing system identification of an input-output system between selected two second physical quantities from the second physical quantities to thereby estimate the input-output system as the relationship, one of the selected two second physical quantities being input to the input-output system as an input physical quantity, the other of the selected two second physical quantities being output from the input-output system as an output physical quantity; and
detecting the occupant's physical input based on the estimated input-output system.

19. The cruise assist method according to claim 18, wherein detecting the occupant's physical input to the steering shaft based on the second physical quantities further comprises:
performing the system identification of the input-output system using a selected one of system identification algorithms, each system identification algorithms including at least one parameter; and
changing, based on environmental information that has a potential to impact on the input-output system, at least one of:
one of the system identification algorithms that has been selected to another one of the system identification algorithms; and
a value of the at least one parameter used by the selected one of the system identification algorithms to another value.

20. The cruise assist method according to claim 19, wherein the environmental information includes at least one of:
information indicative of a curvature of a road on which the vehicle is travelling;
information indicative of a degree of irregularities of the road;
information indicative of a gradient of the road;
information indicative of a friction coefficient of a surface of the road; and
information indicative of at least one of obstacles located around the vehicle.

21. The cruise assist method according to claim 18, wherein detecting the occupant's physical input to the steering shaft further comprises:
estimating the input-output system as a frequency response;
performing a comparison of the frequency response with a predetermined threshold; and
determining whether the occupant's physical input being applied to the steering wheel in accordance with a result of the comparison.

22. The cruise assist method according to claim 21, wherein determining whether the occupant is holding the steering wheel further comprises:
determining that the occupant is holding the steering wheel upon it being determined that the occupant's physical input is being applied to the steering wheel; and
determining that the occupant is not holding the steering wheel upon it being determined that no occupant's physical input is being applied to the steering wheel.

23. The cruise assist method according to claim 14, wherein:
the first physical quantity includes at least one of a measurement value measured by a sensor and depending on rotational movement of the steering shaft, and a calculation value calculated by the measurement value; and
the second physical quantities include at least one of a measurement value measured by a sensor and depending on rotational movement of the steering shaft, a calculation value calculated by the measurement value, and a target value for a controlled variable used by the automatic control mode.

24. The cruise assist method according to claim 14, further comprising:
providing, to the occupant, warning information indicative of urging the occupant to hold the steering wheel upon it being determined that the occupant is not holding the steering wheel.

25. The cruise assist method according to claim 14, further comprising:
cancelling execution of the automatic control mode upon it being determined that the occupant is not holding the steering wheel.

26. The cruise assist system according to claim 1, wherein:
the holding determiner is configured to determine whether the occupant is holding the steering wheel in accordance with the occupant's physical input to the steering shaft via the occupant's operation of the steering wheel while the turning angle controller is executing the automatic cruise control task in the automatic control mode.

27. The cruise assist system according to claim 1, wherein:
the turning angle controller is configured to execute, in an assist control mode, an assist control task that controls the turning angle of the vehicle in accordance with the occupant's operation of the steering wheel while not executing the automatic cruise control task in the automatic control mode.

28. The cruise assist system according to claim 27, wherein:
the holding determiner is configured to determine whether the occupant is holding the steering wheel in accordance with the occupant's physical input to the steering shaft via the occupant's operation of the steering wheel while the turning angle controller is executing the assist control task in the assist control mode.

* * * * *